US012614934B2

(12) United States Patent
Leopold et al.

(10) Patent No.: US 12,614,934 B2
(45) Date of Patent: Apr. 28, 2026

(54) ROTOR FOR AN ELECTRIC MACHINE, AND METHOD FOR PRODUCING A ROTOR

(71) Applicant: Vitesco Technologies Germany GMBH, Hannover (DE)

(72) Inventors: Lennart Leopold, Berlin (DE); Lucas Schmieder, Behring (DE)

(73) Assignee: Vitesco Technologies Germany GMBH, Hannover (DE)

( * ) Notice: Subject to any disclaimer, the term of this patent is extended or adjusted under 35 U.S.C. 154(b) by 407 days.

(21) Appl. No.: 18/164,762

(22) Filed: Feb. 6, 2023

(65) Prior Publication Data

US 2023/0187987 A1      Jun. 15, 2023

Related U.S. Application Data

(63) Continuation of application No. PCT/EP2021/071519, filed on Aug. 2, 2021.

(30) Foreign Application Priority Data

Aug. 6, 2020     (DE) ..................... 10 2020 209 932.4

(51) Int. Cl.
H02K 1/27         (2022.01)
H02K 1/276        (2022.01)
H02K 15/03        (2025.01)

(52) U.S. Cl.
CPC ............. H02K 1/276 (2013.01); H02K 15/03 (2013.01)

(58) Field of Classification Search
CPC .... H02K 1/276; H02K 15/03; H02K 2201/06; H02K 1/27
See application file for complete search history.

(56) References Cited

U.S. PATENT DOCUMENTS

2013/0334907 A1     12/2013  Ikuta
2014/0042856 A1 *    2/2014  Miyashita .............. H02K 1/276
                                                310/156.21
(Continued)

FOREIGN PATENT DOCUMENTS

DE       102014201103 A1     7/2015
DE       102011121793 B4     5/2017
(Continued)

OTHER PUBLICATIONS

International Search Report and Written Opinion dated Nov. 2, 2021 from corresponding International Patent Application No. PCT/EP2021/071519.

(Continued)

*Primary Examiner* — Thomas Truong

(57)                ABSTRACT

A rotor for an electric machine, having a plurality of annular laminated core segments, wherein each laminated core segment is made of a plurality of laminations are arranged one behind the other and are adhered together, each laminated core segment has a first end face and a second end face. Each laminated core segment is equipped with at least one magnet pocket, which extends in the longitudinal direction of the laminated core segment, for receiving a permanent magnet, the permanent magnet is introduced into the magnet pocket solely from the first end face. At least two laminated core segments of the rotor are arranged relative to each other such that the respective first end faces of the laminated core segments face one another and are adhered together, and the respective second end faces of the distal laminated core segments are oriented outwards in the longitudinal direction of the rotor.

12 Claims, 4 Drawing Sheets

(56) References Cited

U.S. PATENT DOCUMENTS

| | | | | |
|---|---|---|---|---|
| 2014/0070654 A1* | 3/2014 | Hamer | ................... | H02K 9/223 |
| | | | | 310/156.21 |
| 2016/0087496 A1* | 3/2016 | Pannier | ................ | H02K 1/2773 |
| | | | | 310/156.56 |
| 2016/0248286 A1 | 8/2016 | Kaiser | | |
| 2017/0302141 A1* | 10/2017 | Yokota | ................... | H02K 15/03 |
| 2020/0161946 A1* | 5/2020 | Kimura | ................. | H02K 15/12 |
| 2020/0177038 A1* | 6/2020 | Fröhlich | ................ | H02K 1/276 |

FOREIGN PATENT DOCUMENTS

| | | | |
|---|---|---|---|
| DE | 102017200186 A1 | 7/2018 | |
| DE | 202019005408 U1 | 7/2020 | |
| JP | 2007282392 A | 10/2007 | |
| JP | 2019033618 A | 2/2019 | |
| WO | 2018179806 A1 | 4/2018 | |

OTHER PUBLICATIONS

German Office Action dated Apr. 1, 2021 for corresponding German Patent Application No. 10 2020 209 932.4.

* cited by examiner

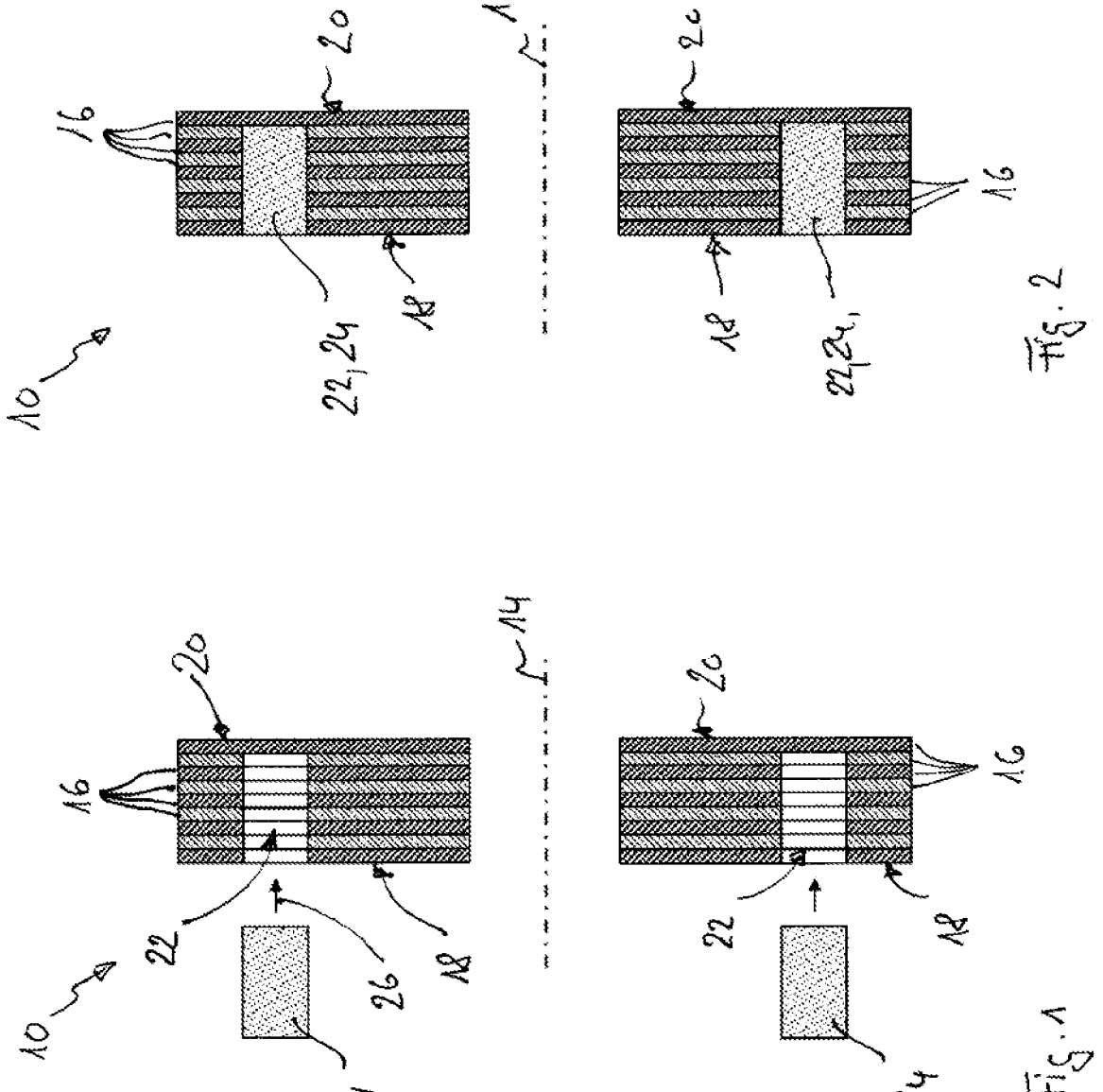

ROTOR FOR AN ELECTRIC MACHINE, AND METHOD FOR PRODUCING A ROTOR

CROSS-REFERENCE TO RELATED APPLICATIONS

This application claims priority to PCT Application PCT/EP2021/071519, filed Aug. 2, 2021, which claims priority to German Patent Application No. DE 10 2020 209 932.4, filed Aug. 6, 2020. The disclosures of the above applications are incorporated herein by reference.

FIELD OF THE INVENTION

The invention concerns a rotor for an electric machine, wherein the rotor has a plurality of laminated core segments, in each of which a magnet pocket is formed for receiving a permanent magnet. The laminated core segments are arranged relative to one another and glued together such that the magnets are captively arranged in the laminated core segments. Moreover, the invention relates to a method for producing the rotor according to the invention.

BACKGROUND OF THE INVENTION

Rotors for electric machines are essentially known. The known rotors generally have a plurality of annular laminated core segments. Magnet pockets are formed through the laminated core segments, in the longitudinal direction of the laminated core segments, so that permanent magnets may be inserted and fixed in the magnet pockets from both end faces. Usually, the laminated core segments are arranged next to one another in their longitudinal direction and pretensioned via tension rods in the longitudinal direction of the rotor. The disadvantage of these known rotors is that the rotor may have a reduced stiffness, whereby the noise-vibration-harshness behavior, or noise development, of the rotor may be increased. Also, the magnets can fall out of the magnet pockets unless they are securely fixed. Therefore in known rotors, it is provided that pressure discs are arranged on the end faces of the outer laminated core segments, which at least partially close the magnet pockets and via which the tension rod forces can be transferred to the laminated core segments.

SUMMARY OF THE INVENTION

It is an object of the invention to provide a rotor for an electric machine which has an increased stiffness and in which the magnets are captively arranged.

The object is achieved by the subject matter of the present disclosure. The disclosure also relates to other refinements of the invention. Each feature may represent an aspect of the invention either individually or in combination.

According to the invention, a rotor is provided for an electric machine, having a plurality of annular laminated core segments, wherein each laminated core segment is made of a plurality of laminations which are arranged one behind the other and substance-bonded together, and each has a first end face and a second end face which is spaced apart from the first end face in the longitudinal direction of the laminated core segment, wherein each laminated core segment has at least one magnet pocket extending in the longitudinal direction of the laminated core segment for receiving a permanent magnet, wherein the magnet pocket is arranged and/or configured such that the permanent magnet may be introduced into the magnet pocket solely from the first end face, wherein a permanent magnet is arranged in the magnet pocket via the first end face, wherein at least two laminated core segments of the rotor are arranged relative to one another such that the respective first end faces of the laminated core segments face one another and are substance-bonded together, and the respective second end faces of the distal laminated core segments are oriented outwards in the longitudinal direction of the rotor.

In other words, one aspect of the present invention is that a rotor is provided for an electric machine of a motor vehicle. The electric machine is, in an embodiment, a permanently excited synchronous machine or a magnetic reluctance machine. The motor vehicle is, in an embodiment, a vehicle which is driven at least partially electrically, wherein the electric machine is arranged in the drive train of the motor vehicle and is configured to drive the vehicle.

The rotor has a plurality of annular laminated core segments. Accordingly, it is provided that the rotor has at least two laminated core segments. It is however conceivable that the rotor has three, four, five, six, seven or more than seven laminated core segments. Each laminated core segment includes a plurality of individual laminations which are arranged next to and/or behind one another and are connected together by substance bonding to form a laminated core segment. The substance-bonded connection is, in an embodiment, an adhesive connection or a glued connection. A laminated core segment formed in this way has a first end face and a second end face which is spaced apart from the first end face in the longitudinal direction of the laminated core segment.

At least one magnet pocket is formed in each laminated core segment, extending in the longitudinal direction of the laminated core segment, for receiving a permanent magnet. The magnet pocket is configured such that a permanent magnet is inserted in the magnet pocket solely from the first end face. It is not possible to insert the permanent magnet in the magnet pocket from the second end face. For this, it may be provided that the magnet pocket indeed extends in the longitudinal direction of the laminated core segment, but not all the way through. It is however also conceivable that a cutout in the lamination forming the second end face of the laminated core segment has a cross-section which is smaller than a cross-section and/or cross-sectional area of the permanent magnet. Thus a permanent magnet inserted in the magnet pocket via the first end face cannot slip through.

A permanent magnet is inserted in the at least one magnet pocket. Also, at least two laminated core segments of the rotor are arranged relative to one another such that the first end faces of the laminated core segments face one another. In this way, the respective second end faces, which prevent the permanent magnets from slipping through, face outward in the longitudinal direction of the rotor. Even if the rotor has more than two laminated core segments, the respective second ends of the distal laminated core segments face outward. The distal laminated cores are the respective outer laminated core segments of the plurality of laminated core segments arranged on the rotor shaft. The laminated core segments are connected together by substance bonding. The substance-bonded connection is, in an embodiment, a glued connection. The substance-bonded connection encloses the permanent magnets captively in the laminated core segments. Furthermore, the substance-bonded connection of the laminated core segments may increase the stiffness of the rotor.

A development of the invention is that the rotor has no tension rod and/or clamping element. In this way, the installation space of the rotor in the longitudinal direction is reduced, since there are no protruding armature heads, tension rods or clamping elements. Also, the omission of tension rods may reduce costs and/or working steps.

A development of the invention provides that the rotor has no pressure disc, end plate and/or clamping plate. In other words, no pressure discs, end plates and/or clamping plates are arranged at the distal ends of the laminated core segments in order to at least partially close any continuous magnet pockets arranged in the laminated core segments and/or transfer the tension rod forces into the laminated core segments. Pressure discs may be known as clamping plates. Such pressure discs and/or clamping plates may also be screwed onto the rotor shaft in order to clamp the laminations of the laminated core segments in the axial direction of the rotor without the use of tension rods. The omission of the end plates, pressure discs and/or clamping plates may reduce the installation space of the rotor in the longitudinal direction. The omission of end plates may also save costs and reduce the weight of the rotor.

In a refinement of the invention, it is provided that a lamination forming the second end face of the laminated core segment has no magnet pocket or has a cutout in the extension of the magnet pocket of the laminated core segment which is smaller than a cross-section and/or a cross-sectional area of the permanent magnet. Thus a permanent magnet inserted in the magnet pocket via the first end face cannot slip through.

A refinement of the invention provides that the laminated core segments are arranged offset to one another in the circumferential direction such that the magnet pockets of adjacent laminated core segments have a staggered arrangement. With respect to the longitudinal direction of the rotor, the staggered arrangement of the permanent magnets arranged in the magnet pockets may have a linear, V-shaped, alternating or zigzag configuration. The staggered arrangement of the magnet pockets or permanent magnets arranged therein may positively influence the torque ripple and/or the noise-vibration-harshness behavior of the rotor or electric machine.

According to a refinement of the invention, it is provided that the permanent magnets are arranged in the magnet pockets by force fit and/or form fit and/or substance bonding. A force-fit clamping of the permanent magnets is achieved via tabs protruding into the magnetic pockets, which are bent and/or deflected when the permanent magnet is inserted in the magnet pocket in the insertion direction or longitudinal direction of the rotor, and exert a spring force on the permanent magnet in the radial direction of the rotor. The force-fit clamping of the permanent magnets provides that—apart from the formation of the corresponding tabs during punching of the laminations—no further work step is required for fixing the permanent magnets in the magnet pockets after insertion, whereby the production process of the rotor may be accelerated. A form-fit arrangement of the permanent magnets in the magnet pockets may be achieved by caulking of the permanent magnets after insertion in the magnet pockets. During the caulking, after insertion of the permanent magnets in the magnet pockets, at least the lamination forming the first end face is deformed, in an embodiment by a graining device, in the region of the magnetic pocket so that the permanent magnet is fixed in the magnet pocket. It is also conceivable that, starting from the first end face, a plurality of laminations are deformed by the graining device during the caulking process, in the region of the magnet pocket, in order to fix the permanent magnets in the magnet pockets. A development of the invention is thus that the form-fit connection is a caulked connection. A substance-bonded connection of the permanent magnets in the magnet pocket may be a glued connection. The glued connection may include a non-foaming and/or non-expanding adhesive. It is also conceivable that the adhesive connection includes a foaming and/or expanding adhesive. The adhesive connection may be hardened under UV light and/or by heat application.

In a refinement of the invention, it is provided the laminations of a laminated core segment have punchings in the region of the magnet pockets which differ from one another. In this way for example, corresponding tabs may be formed in every second lamination in the region of the magnet pocket and/or in the cutout for forming the magnet pocket, for force-fit fixing of the permanent magnets in the magnet pockets. No such tab is made or a clearance is formed in the respective adjoining lamination so that, on insertion of the permanent magnet in the magnet pocket, the tab is deflected and diverted into the corresponding clearance of the adjacent lamination.

According to a refinement of the invention, it is provided that the laminated core segments have a rotor shaft receiving opening through which a rotor shaft is guided, and the laminated core segments sit by press fit on the rotor shaft or are shrunk onto the rotor shaft. In this way, the laminated core segments may easily and cheaply be arranged on the rotor shaft in a rotationally fixed fashion.

In a refinement of the invention, it is provided that at least one recess is formed in the second end face of the distal laminated core segments for balancing the rotor. In other words, to balance the rotor, at least partially, material is removed from the second end face of the distal laminated core segment. This removal may take place for example by drilling and/or milling. The rotor is thus balanced by a material removal or material extraction process, which may also be described as negative balancing. The direct negative balancing in the laminated core segment is possible only because the individual laminations of the laminated core segment are connected together by substance bonding or glued together. If the laminations are not glued, the individual laminations, specifically the outer laminations of the laminated core segment, would fan out on extraction of the drill or milling cutter from the bore. This does not however occur with laminations which are glued into a laminated core segment. In this way, the rotor or may easily be balanced in order to improve the running properties and performance of the rotor.

The invention also relates to a method for producing the rotor according to the invention, including the steps of:

provision of a plurality of annular punched laminations for forming a laminated core segment, wherein at least one cutout for forming a magnet pocket is provided in almost all laminations;

arrangement of the laminations one behind the other into a laminated core segment having a first end face and a second end face, which is spaced apart from the first end face in the longitudinal direction of the laminated core segment, and the cutouts form a magnet pocket for receiving a permanent magnet, wherein the permanent magnet is introduced into the magnet pocket solely via the first end face;

substance-bonded connection of the laminations to form a laminated core segment;

insertion of a permanent magnet in the magnet pocket;

arrangement of at least two laminated core segments such that the respective first end faces of the laminated core segments face one another; and substance-bonded connection of the laminated core segments.

It is conceivable that the laminations are first stacked on one another and glued together and/or baked to form a laminated core segment, and then the permanent magnets are arranged in the magnet pockets. In an embodiment, before the punching process to form the annular laminations, a baking lacquer is applied to a top side of the lamination blank formed parallel to the plane of the lamination. The baking lacquer is an adhesive layer which is only activated by the application of heat. In other words, the baking lacquer is not adhesive in its starting state. The laminations are stacked on one another and substance-bonded together by the application of heat. In this way, the entire top side of the lamination may be provided with the baking lacquer or adhesive layer. Thus a maximum adhesion effect between the laminations is achieved.

The baking lacquer and/or the adhesive need not necessarily be applied to the lamination before punching. It is also conceivable that the baking lacquer or adhesive is applied to the lamination or top side of the lamination after punching. The baking lacquer or adhesive may be applied to and/or placed on the top side of the lamination over the entire surface or merely portions thereof. The baking lacquer may be laminated or sprayed on.

The adhesive or baking lacquer may be provided on the two mutually spaced top sides of the laminations, so that the laminated core segments are substance-bonded together accordingly.

A refinement of the invention provides that, before the substance-bonded connection or glueing and/or baking of the individual laminations into a laminated core segment, the permanent magnets are arranged in the pre-packed and/or punch-packed laminated core segments. Punch-packing allows the laminations to be connected together by form fit. Then the laminated core segments are arranged one behind the other and/or next to one another and glued such that the first end faces of at least two laminated core segments face one another and, with respect to the entire laminated core segment arrangement, in the respective distal laminated core segments, the second ends face outward in the axial direction. Then the entire laminated core segment arrangement is heated, whereby the substance-bonded connection or adhesive between the laminations and the laminated core segments hardens, and the laminations and laminated core segments are permanently and unreleasably connected together. This provides that the laminations need only be heated once for connection into an entire laminated core segment arrangement. It is thus possible to reduce the production costs. Also, the method saves material for the laminations since only one heating process takes place.

A refinement of the invention provides that the hardening of the substance-bonded connection and/or the glueing of the laminated core segments takes place under application of heat, and directly after the hardening of the glue and in the still warm state of the interconnected laminated core segments, the rotor shaft is guided and/or pressed through a rotor shaft receiving opening of the laminated core segments and arranged on the rotor shaft in rotationally fixed fashion after cooling of the laminated core segments. The rotor shaft is here pressed into the still warm laminated core segments. Because of the heating of the laminated core segments, a diameter of the rotor shaft receiving opening is slightly larger than in the cold state, so that the rotor shaft may be pressed into the rotor shaft receiving opening with smaller force. In this way, the press for pressing the rotor shaft into the rotor shaft receiving opening is designed accordingly.

Also, the rotor shaft is pressed into the laminated core segments in a material-saving fashion.

The invention also concerns an electric machine for use in a drive train of an at least partially electrically driven motor vehicle with the rotor according to the invention.

Further features and advantages of the present invention will emerge from the following exemplary embodiment.

The exemplary embodiment is to be understood not as restrictive, but rather as an example. It is intended to enable the person skilled in the art to carry out the invention. The applicant reserves the right to make one and/or more of the features disclosed in the exemplary embodiment and include such features described. The exemplary embodiment will be discussed in more detail on the basis of drawings.

BRIEF DESCRIPTION OF THE DRAWINGS

In the drawings:

FIG. 1 shows a longitudinal section through a laminated core segment of a rotor according to a preferred exemplary embodiment of the invention;

FIG. 2 shows a longitudinal section through the laminated core segment with permanent magnets arranged therein;

DETAILED DESCRIPTION OF THE PREFERRED EMBODIMENT

Figures 3, 4:
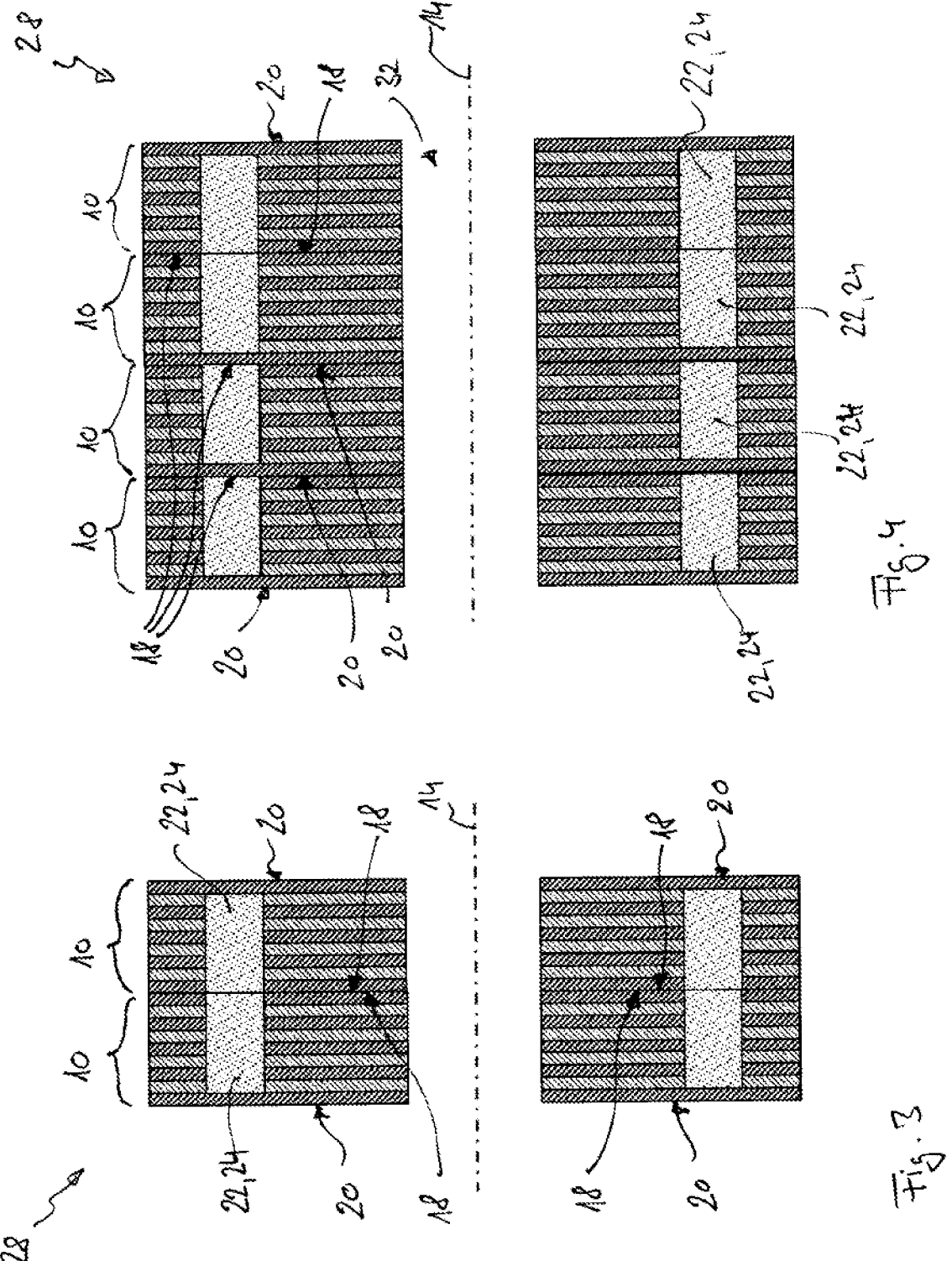
FIG. 3 shows a longitudinal section through two laminated core segments glued together.
FIG. 4 shows a longitudinal section through four laminated core segments glued together.

The following description of the preferred embodiment(s) is merely exemplary in nature and is in no way intended to limit the invention, its application, or uses.

FIG. 1 shows a longitudinal section through a laminated core segment 10 of a rotor 12 of an electric machine. The laminated core segment 10 has a longitudinal axis 14 and is formed by a plurality of annular laminations 16. In order to form the laminated core segment 10, the laminations 16 are arranged one behind the other in their longitudinal direction and connected together by substance bonding. The substance-bonded connection is preferably an adhesive connection or a glued connection. A laminated core segment 10 formed in this way has a first end face 18 and a second end face 20, which is spaced apart from the first end face 18 in the longitudinal direction of the laminated core segment 10.

At least one magnet pocket 22 is formed in each laminated core segment 10 and extends in the longitudinal direction of the laminated core segment 10, for receiving a permanent magnet 24. Usually, a laminated core segment 10 includes a plurality of magnet pockets 22, which are spaced apart from one another in the circumferential direction of the laminated core segment 10. The magnet pocket 22 is configured such that the permanent magnet 24 is introduced into the magnet pocket 22 solely from or via the first end face 18, as shown by the direction arrow 26. The permanent magnet 24 cannot be inserted in the magnet pocket 22 starting from the second end face 20. For this, it is provided that the magnet pocket 22 indeed extends in the longitudinal direction of the laminated core segment 10, but not all the way through. In other words, the magnet pocket 22 does not extend from the first end face 18 to the second end face 20. Rather, the lamination 16 forming the second end face 20 closes the magnet pocket 22 or has a cutout in the course of the magnet pocket 22, the cross-section and/or cross-sectional area of which is smaller than a cross-section and/or cross-sectional area of the permanent magnet 24. In this way, the permanent magnet 24 inserted in the magnet pocket 22 via the first end face 18 is prevented from slipping through the lamination 16 of the laminated core segment 10 forming the second end face 20.

FIG. 2 shows the laminated core segment 10 known from FIG. 1, wherein the permanent magnet(s) 24 is/are inserted in the magnet pocket 22 via the first end face 18. The lamination forming the second end face 20 serves as a stop for the permanent magnet 24 and prevents the permanent magnet 24 from slipping through. The permanent magnet 24 may be arranged and fixed in the magnet pocket 22 by substance bonding, form fit or force fit.

FIG. 3 shows a longitudinal section through two laminated core segments 10 which are substance-bonded or glued together. The two laminated core segments 10 are identical in structure and already known from FIG. 2. Each laminated core segment has a first end face 18 and a second end face 20. The permanent magnets 24 are arranged and positionally securely fixed in the magnet pockets 22 of the laminated core segments 10. Also, the two laminated core segments 10 of the rotor 12 are arranged relative to one another such that the first end faces 18 of the laminated core segments 10 face one another. In this way, the respective second end faces 20, which prevent the permanent magnets 24 from slipping through, face outward in the longitudinal direction of the laminated core segment arrangement 28. The laminated core segments 10 are connected together by substance bonding, or glued together. Because of the gluing, the permanent magnets 24 are captively enclosed in the laminated core segments 10. Furthermore, because of the glueing of the laminated core segments 10, the stiffness of the laminated core segment arrangement 28 is increased.

FIG. 4 shows a longitudinal section through four laminated core segments 10 which are glued together, and in this arrangement may also be called a laminated core segment arrangement 28. Each pair of laminated core segments 10 are arranged relative to one another such that the first end faces 18 face one another. Also, if the interconnected laminated core segments 10 are viewed together, the other laminated core segments 10 are arranged relative to one another and substance-bonded together such that, at each outer laminated core segment 10 relative to the longitudinal direction of the laminated core segment arrangement 28, the second end face 20 is directed outward. Thus all permanent magnets 24 arranged in the laminated core segments 10 may be captively arranged in the laminated core segment arrangement 28.

Figure 5:
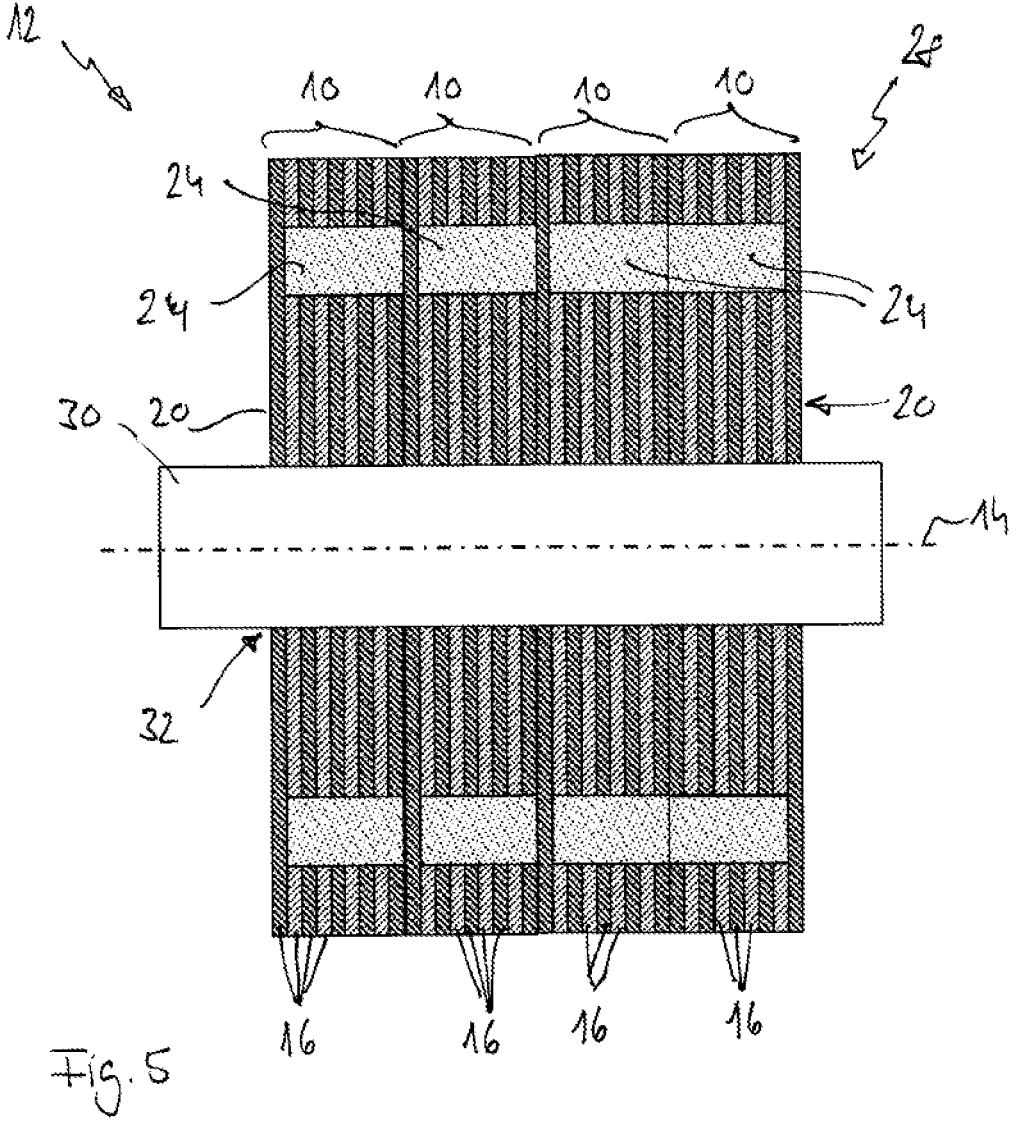
FIG. 5 shows a longitudinal section through a rotor.

FIG. 5 shows a longitudinal section through the rotor 12 with the four glued-together laminated core segments 10 known from FIG. 4. After the laminated core segments 10 have been glued together, the glue connection is hardened under application of heat. This is known as "baking". Immediately after hardening, a rotor shaft 30 is pressed into a rotor shaft receiving opening 32 formed in the laminated core segments 10. Because the inner diameter of the rotor shaft receiving opening 32 is slightly larger when warm, the rotor shaft 30 may be pressed into the rotor shaft receiving opening 32 with reduced force. After cooling of the laminated core segments 10 or the laminated core segment arrangement 28, the laminated core segment arrangement 28 sits rotationally fixedly on the rotor shaft 30. Because of the glueing of the laminated core segments 10, there is no need for pretensioning of the laminated core segments 10 in the longitudinal direction of the rotor 12, so the rotor 12 is formed without tension rods, end plates and/or clamping plates. Thus the production costs of the rotor, the weight of the rotor and/or the installation space of the rotor in its longitudinal direction, is reduced.

Figure 6:
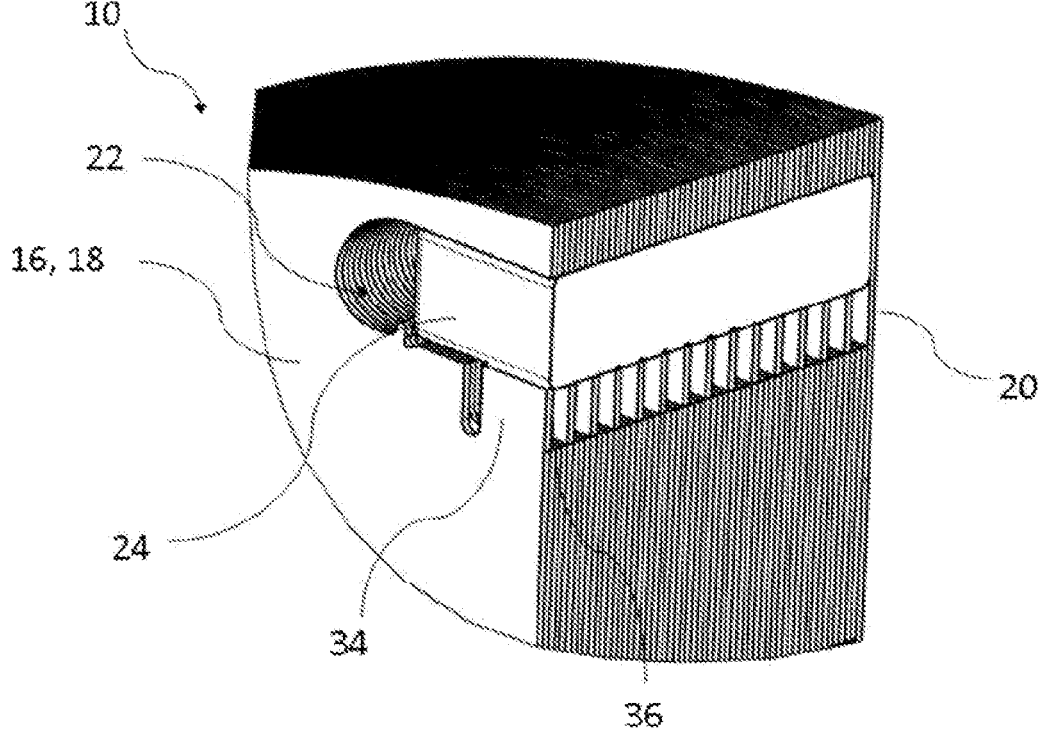
FIG. 6 shows a three-dimensional view of the laminated core segment in the region of a magnet pocket.

FIG. 6 shows a detail view of the laminated core segment 10 in the region of the magnet pocket 22. Every second lamination 16 has at least one tab 34 which protrudes at least in portions into the magnet pocket 22 in the radial direction of the laminated core segment 10. A lamination 16 without tab and having a clearance 36 adjoins the lamination 16 with the tab 34. On insertion of the permanent magnet 24 in the magnet pocket 22, the tab 34 may thus at least in portions deflect in the longitudinal direction of the laminated core segment 10. The tab 34 exerts a press force and/or contact force on the permanent magnet 24 and fixes this in the magnet pocket 22 by force fit. On a side facing away from the first end faces 18, the magnet pocket 22 has a lamination 16 which completely and/or partially closes the magnet pocket 22, so that the permanent magnet 24 cannot slip through. In other words, the lamination forming the second end face 20 has no opening and/or cutout in the region in the course of the magnet pocket 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotor for an electric machine, comprising:
   a plurality of annular laminated core segments, each of the plurality of laminated core segments further comprising:
      a plurality of laminations which are arranged one behind the other and substance-bonded together, and each of the plurality of laminations has a first end face and a second end face which is spaced apart from the first end face in the longitudinal direction of the laminated core segment;
      at least one magnet pocket extending in the longitudinal direction of the laminated core segment for receiving a permanent magnet, wherein the magnet pocket is arranged and/or configured such that the permanent magnet is introduced into the magnet pocket solely from the first end face, and one of the plurality of laminations having the second end face is devoid of the at least one magnet pocket;
      wherein the permanent magnet is arranged in the magnet pocket via the first end face and is adjacent to and in contact with the one of the plurality of laminations having the second end face;
   wherein at least two of the plurality of laminated core segments of the rotor are arranged relative to one another such that the respective first end faces of the at least two of the plurality of laminated core segments face one another and are connected by substance bonding such that the permanent magnet of each of the at least two of the plurality of laminated core segments are adjacent one another, and two of the plurality of annular laminated core segments are distal to one another and have respective second end faces which are oriented outwards in the longitudinal direction of the rotor, and a third of the plurality of laminated core segments is adjacent one of the at least two of the plurality of laminated core segments such that the permanent magnet and the first end face of the third of the plurality of laminated core segments are adjacent to and in contact with the second end face of one of the at least two of the plurality of laminated core segments.

2. The rotor of claim 1, wherein the rotor is devoid of a tension rod and/or clamping element.

3. The rotor of claim 1, wherein the rotor is devoid of a pressure disc, end plate and/or clamping plate.

4. The rotor of claim 1, wherein the plurality of annular laminated core segments are arranged offset to one another in the circumferential direction such that the at least one magnet pocket of each of the plurality of annular laminated core segments arranged offset to one another in the circumferential direction have a staggered arrangement.

5. The rotor of any of claim 1, wherein the permanent magnet is arranged in the at least one magnet pocket by force fit and/or form fit and/or substance bonding.

6. The rotor of any of claim 1, each of the plurality of laminations further comprising punchings in the region of the at least one magnet pocket which differ from one another.

7. The rotor of claim 1, the laminated core segments further comprising:

a rotor shaft receiving opening through which a rotor shaft is guided;

wherein the plurality of annular laminated core segments sit by press fit on the rotor shaft or are shrunk onto the rotor shaft.

8. A method for producing a rotor, comprising the steps of:

providing a plurality of annular punched laminations for forming a plurality of laminated core segments;

providing at least one cutout in one or more of the plurality of annular punched laminations for forming at least one magnet pocket in each of the plurality of laminated core segments, the at least one magnet pocket for receiving a permanent magnet;

arranging the plurality of annular punched laminations one behind the other to form each of the plurality of laminated core segments, such that each of the plurality of laminated core segments has a first end face and a second end face, where the second end face is spaced apart from the first end face in the longitudinal direction of each laminated core segment, and one of the plurality of laminations having the second end face is devoid of the at least one magnet pocket;

substance-bonding the plurality of annular punched laminations to form each of the plurality of laminated core segments;

introducing the permanent magnet into the magnet pocket solely via the first end face and/or starting from the first end face; and inserting the permanent magnet into the magnet pocket such that the permanent magnet is adjacent to and in contact with the one of the plurality of laminations having the second end face;

arranging the plurality of laminated core segments such that the respective first end faces of at least two of the plurality of laminated core segments face one another and the permanent magnet of the at least two of the plurality of laminated core segments are adjacent one another, and a third of the plurality of laminated core segments is adjacent one of the at least two of the plurality of laminated core segments such that the permanent magnet and the first end face of the third of the plurality of laminated core segments are adjacent to and in contact with the second end face of one of the at least two of the plurality of laminated core segments.

9. The method of claim 8, further comprising the steps of:

providing at least two laminated core segments;

arranging at least two laminated core segments such that the respective first end faces of the laminated core segments face one another; and connecting the laminated core segments using a substance-bond.

10. The method of claim 9, further comprising the steps of before substance-bond connecting and/or glueing of the individual plurality of annular punched laminations into the laminated core segment, arranging the permanent magnets in each of the at least two laminated core segments, arranging the at least two laminated core segments one behind the other and/or next to one another and glued such that the first end faces of the at least two laminated core segments face one another and, with respect to the laminated core segment arrangement, in the respective distal laminated core segments, the second ends face outward in the axial direction, heating the laminated core segment arrangement, such that the adhesive between the plurality of annular punched laminations and the laminated core segments hardens and the plurality of annular punched laminations and laminated core segments are permanently and unreleasably connected together.

11. The method of claim 9, further comprising the steps of:

applying heat to cause hardening of the substance-bonded connection and/or the gluing of the laminated core segments;

directly after the hardening of the substance-bonded connection and/or the gluing and in the still warm state of the interconnected laminated core segments, the rotor shaft is guided and/or pressed through a rotor shaft receiving opening of the laminated core segments and arranged on the rotor shaft in rotationally fixed fashion after cooling of the laminated core segments.

12. The method of claim 9, further comprising the steps of providing an electric machine, such that the rotor is part of the electric machine.

* * * * *